United States Patent
Kim et al.

(10) Patent No.: US 10,699,056 B1
(45) Date of Patent: Jun. 30, 2020

(54) COMPUTER-IMPLEMENTED METHOD, PROCESSOR-IMPLEMENTED SYSTEM, AND NON-TRANSITORY COMPUTER-READABLE STORAGE MEDIUM STORING INSTRUCTIONS FOR SIMULATION OF PRINTED CIRCUIT BOARD

(71) Applicant: SAMSUNG ELECTRONICS CO., LTD., Suwon-si (KR)

(72) Inventors: Youngbae Kim, Seoul (KR); Kyungsuk Oh, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/507,834

(22) Filed: Jul. 10, 2019

(30) Foreign Application Priority Data

Jan. 21, 2019 (KR) .................. 10-2019-0007539

(51) Int. Cl.
| | |
|---|---|
| *G06F 17/50* | (2006.01) |
| *G06F 30/398* | (2020.01) |
| *G06F 30/392* | (2020.01) |
| *G06F 113/18* | (2020.01) |
| *G06F 119/08* | (2020.01) |
| *G06F 30/3308* | (2020.01) |

(52) U.S. Cl.
CPC .......... *G06F 30/398* (2020.01); *G06F 30/392* (2020.01); *G06F 30/3308* (2020.01); *G06F 2113/18* (2020.01); *G06F 2119/08* (2020.01)

(58) Field of Classification Search
CPC .. G06F 30/398; G06F 30/392; G06F 30/3308; G06F 2113/18; G06F 2119/08

USPC ............................ 716/112, 137, 136; 703/14
See application file for complete search history.

(56) References Cited

U.S. PATENT DOCUMENTS

| | | | |
|---|---|---|---|
| 4,820,170 A * | 4/1989 | Redmond ............. | B29C 69/001 439/66 |
| 7,139,678 B2 | 11/2006 | Kobayashi et al. | |
| 7,730,444 B2 | 6/2010 | Itoh et al. | |
| 8,225,267 B2 | 7/2012 | Sekiguchi | |
| 9,173,296 B2 | 10/2015 | Watanabe | |
| 2003/0137024 A1* | 7/2003 | Moriya ................. | B82Y 10/00 430/5 |
| 2016/0165714 A1* | 6/2016 | Chen .................... | H05K 3/4602 174/250 |
| 2017/0295505 A1 | 10/2017 | Mueller et al. | |

(Continued)

FOREIGN PATENT DOCUMENTS

| | | | | | |
|---|---|---|---|---|---|
| JP | | 08311420 A | * | 11/1996 | ............. H05K 3/321 |
| JP | | 2001076541 A | * | 3/2001 | |
| JP | | 2006-252113 A | | 9/2006 | |

(Continued)

*Primary Examiner* — Phallaka Kik
(74) *Attorney, Agent, or Firm* — Sughrue Mion, PLLC

(57) ABSTRACT

A computer-implemented method for a simulation of a printed circuit board includes dividing a layout of the printed circuit board into elements having the same size, detecting first elements that have at least two materials from the elements, calculating anisotropic attributes of the first elements and assigning the anisotropic attributes to each of the first elements, and calculating a warpage of the printed circuit board based on the anisotropic attributes of the first elements. The anisotropic attributes depend on physical properties according to directions of the first elements on the layout.

20 Claims, 11 Drawing Sheets

(56) References Cited

U.S. PATENT DOCUMENTS

2018/0199455 A1* 7/2018 Hurbi .................... G06F 1/1658

FOREIGN PATENT DOCUMENTS

| | | |
|---|---|---|
| JP | 2007-81326 A | 3/2007 |
| JP | 3927076 B2 | 6/2007 |
| JP | 4260149 B2 | 4/2009 |
| JP | 4618065 B2 | 1/2011 |
| JP | 5234639 B2 | 7/2013 |
| JP | 2016-81317 A | 5/2016 |
| WO | WO-2005050733 A1 * | 6/2005 ........... H05K 1/0237 |

* cited by examiner

COMPUTER-IMPLEMENTED METHOD, PROCESSOR-IMPLEMENTED SYSTEM, AND NON-TRANSITORY COMPUTER-READABLE STORAGE MEDIUM STORING INSTRUCTIONS FOR SIMULATION OF PRINTED CIRCUIT BOARD

CROSS-REFERENCE TO RELATED APPLICATIONS

This application claims priority under 35 U.S.C. § 119 from Korean Patent Application No. 10-2019-0007539 filed on Jan. 21, 2019, in the Korean Intellectual Property Office, the disclosure of which is incorporated by reference herein in its entirety.

BACKGROUND

1. Field

Embodiments of the inventive concept described herein relate to simulation of a printed circuit board, and more particularly, to a computer-implemented method and a processor-implemented system, which perform simulation of a printed circuit board with a reduced resource and/or improved accuracy, and a non-transitory computer-readable storage medium storing instructions for simulation of the printed circuit board.

2. Description of the Related Art

Printed circuit boards are being used in various fields of electronic or electric devices. For example, the printed circuit boards may be used to connect semiconductor dies stacked on the printed circuit boards with any other devices. In particular, some printed circuit boards may be mounted within semiconductor packages and may be used to provide channels between semiconductor dies in the semiconductor packages and external devices.

As semiconductor manufacturing technologies develop, the degree of integration and the complexity of semiconductor dies are increasing. As the degree of integration and the complexity of semiconductor dies increase, the degree of integration and the complexity of printed circuit boards connected with the semiconductor dies also increase.

As the degree of integration and the complexity of the printed circuit boards increase, very small warpage of the printed circuit boards may cause a defect of connections between printed circuit boards and semiconductor dies, and of connections between the printed circuit boards and external devices.

SUMMARY

It is an aspect to provide a computer-implemented method and a processor-implemented system, which perform simulation of a printed circuit board with a reduced resource and/or improved accuracy, and a non-transitory computer-readable storage medium storing instructions for simulation of the printed circuit board.

According to an aspect of an exemplary embodiment, there is provided a computer-implemented method for a simulation of a printed circuit board, the method including dividing a layout of the printed circuit board into elements having the same size, detecting first elements that have at least two materials from the elements, calculating anisotropic attributes of the first elements and assigning the anisotropic attributes to each of the first elements, and calculating a warpage of the printed circuit board based on the anisotropic attributes of the first elements. The anisotropic attributes depend on physical properties according to directions of the first elements on the layout.

According to another aspect of an exemplary embodiment, there is provided a processor-implemented system for a simulation of a printed circuit board, the system including a processor, and a non-transitory computer-readable recording medium configured to communicate with the processor and to store instructions that, when executed by the processor, cause the processor to perform operations. The operations include dividing a layout of the printed circuit board into elements having the same size, detecting first elements that have at least two materials from the elements, calculating anisotropic attributes of the first elements and assigning the anisotropic attributes to each of the first elements, and calculating a warpage of the printed circuit board based on the anisotropic attributes of the first elements. The anisotropic attributes depend on directions of the first elements on the layout.

According to another aspect of an exemplary embodiment, there is provided a non-transitory computer-readable recording medium stores instructions that, when executed by a processor, the cause the processor to perform operations. The operations include dividing a layout of the printed circuit board into elements having the same size, detecting first elements that have at least two materials from the elements, calculating anisotropic attributes of the first elements and assigning the anisotropic attributes to each of the first elements, detecting second elements that have a single material from the elements, calculating isotropic attributes of the second elements and assigning the isotropic attributes to each of the second elements, and calculating a warpage of the printed circuit board based on the anisotropic attributes of the first elements and the isotropic attributes of the second elements.

BRIEF DESCRIPTION OF THE FIGURES

The above and other aspects will become apparent by describing in detail exemplary embodiments thereof with reference to the accompanying drawings, in which.

DETAILED DESCRIPTION

Below, embodiments of the inventive concept may be described in detail and clearly to such an extent that an ordinary one in the art may easily implement the inventive concept.

Figure 1:
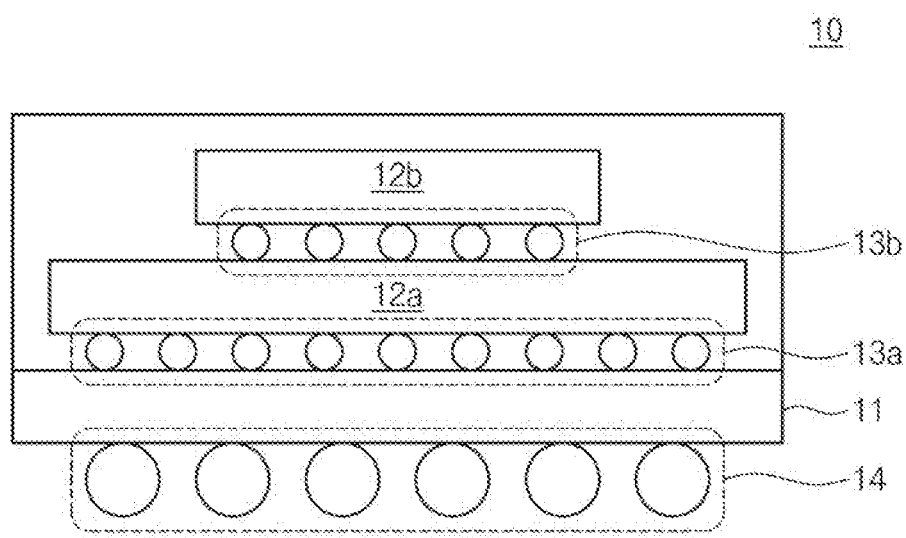
FIG. 1 illustrates a semiconductor package according to an embodiment.

FIG. 1 illustrates a semiconductor package according to an embodiment.

Referring to FIG. 1, a semiconductor package 10 includes a printed circuit board 11, a first semiconductor die 12a and a second semiconductor die 12b, first internal solder balls 13a and second internal solder balls 13b, and external solder balls 14. The first and second semiconductor dies 12a and 12b may be stacked on the printed circuit board 11.

The printed circuit board 11 may be connected with the first semiconductor die 12a through the first internal solder balls 13a. The first semiconductor die 12a may be connected with the second semiconductor die 12b through the second internal solder balls 13b. The first semiconductor die 12a may include internal wires that connect the second internal solder balls 13b with a part of the first internal solder balls 13a and connect internal circuits of the first semiconductor die 12a with the others of the first internal solder balls 13a.

The printed circuit board 11 may include wires that connect the first internal solder balls 13a and the external solder balls 14. Wires may be disposed on a top surface (e.g., a surface being in contact with the first internal solder balls 13a) of the printed circuit board 11, a bottom surface (e.g., a surface on which the solder balls 14 are disposed) of the printed circuit board 11, and inside the printed circuit board 11.

The semiconductor package 10 may be connected with an external device through the external solder balls 14. For example, the semiconductor package 10 may be attached on another printed circuit board through the external solder balls 14.

An example is illustrated in FIG. 1 as the semiconductor package 10 is based on a flip chip. However, the inventive concept is not limited to the example in which the semiconductor package 10 is based on a flip chip. For example, the semiconductor package 10 may be based on bonding wires or may be based on through silicon vias (TSVs).

As the degree of integration and the complexity of the semiconductor dies 12a and 12b increase, the degree of integration and the complexity of the printed circuit board 11 is increasing. As the degree of integration and the complexity of the printed circuit board 11 increase, the warpage may occur in the printed circuit board 11 due to various factors (e.g., a force and/or a temperature) in the process of manufacturing the semiconductor package 10 and/or in the process of attaching the semiconductor package 10 to an external device.

In the case where the warpage occurs in the printed circuit board 11, a defect may occur in connections between the first and second semiconductor dies 12a and 12b in the semiconductor package 10 and the solder balls 14. This may cause an error of the semiconductor package 10.

Simulation of the printed circuit board 11 may be performed to predict the warpage of the printed circuit board 11 in advance. The simulation may be performed on a data-based layout indicating the printed circuit board 11. As the simulation is performed on the data-based layout, the warpage that occurs in the physically based actual printed circuit board 11 may be predicted.

One of the ways to simulate the printed circuit board 11 may be based on a geometry of the layout of the printed circuit board 11. For example, meshes may be generated in the layout, based on the geometry of the layout of the printed circuit board 11. The warpage of the printed circuit board 11 may be predicted by using the meshes.

However, this geometry-based method causes an exponential increase in the amount of operations as the degree of integration and the complexity of the printed circuit board 11 increases. That is, a huge amount of resources are required to perform simulation based on the geometry.

Another of the ways to simulate the printed circuit board 11 may be based on simplification of the layout of the printed circuit board 11. For example, when a ratio of a specific material in a specific area of the layout of the printed circuit board 11 is not less than a threshold ratio, the specific area may be simplified as being filled with the specific material.

The amount of operations for the simulation may decrease through the simplification, and thus, the amount of necessary resources may decrease. However, the simplification may cause an excessive loss of information, thereby making accuracy of the simulation low.

By contrast to the geometry-based method and the simplification method, according to embodiments of the inventive concept, simulation of a printed circuit board may be performed with the same accuracy and the reduced amount of operations or reduced resources, or simulation of a printed circuit board may be performed with the same accuracy and with a reduced operation amount or reduced resources, or may be performed with the same operation amount or resources and with improved accuracy.

Figure 2:
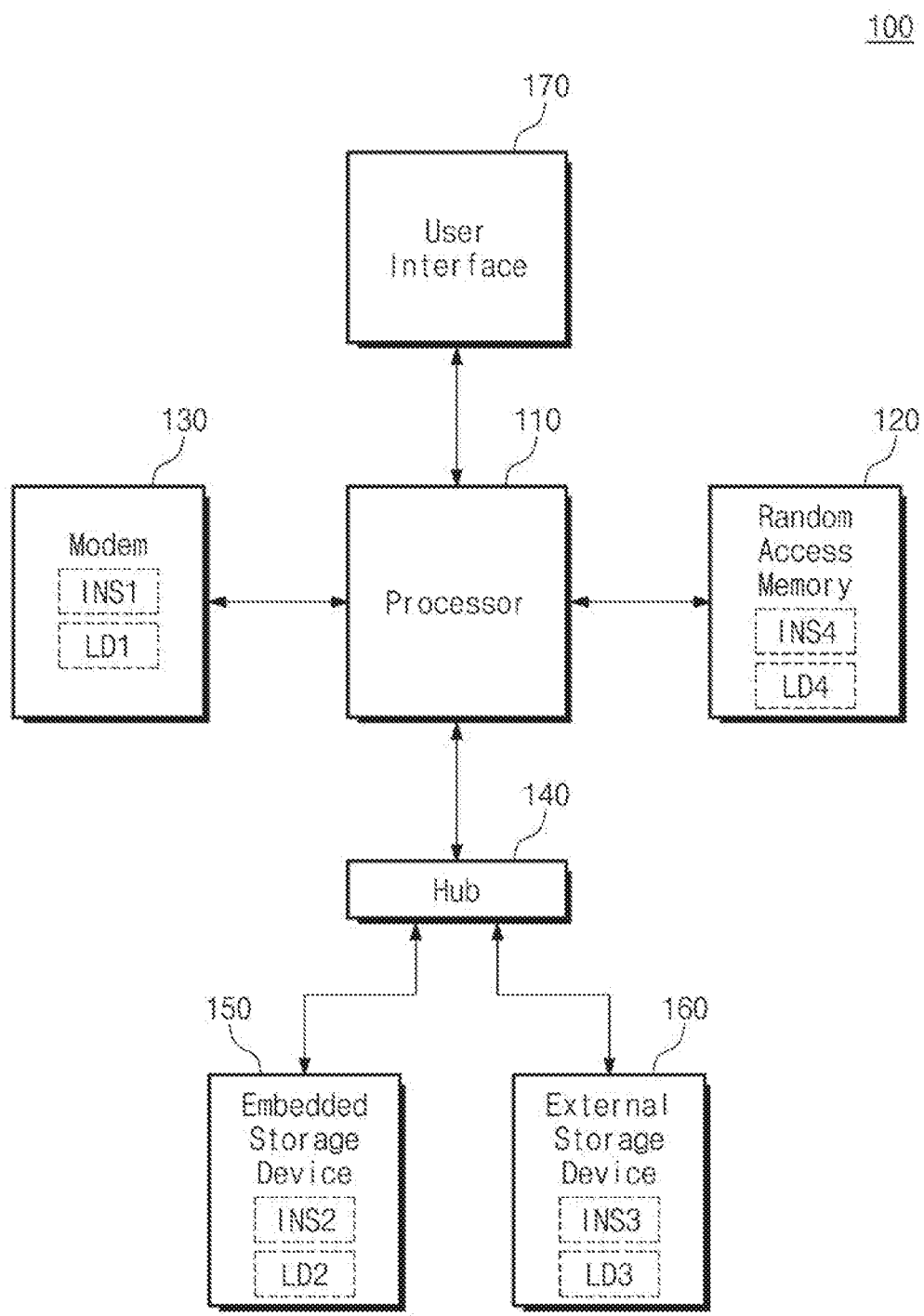
FIG. 2 is a block diagram illustrating a system according to an embodiment.

FIG. 2 is a block diagram illustrating a system 100 according to an embodiment. Referring to FIGS. 1 and 2, the system 100 may include a processor 110, a random access memory 120, a modem 130, a hub 140, an embedded storage device 150, an external storage device 160, and a user interface 170.

The processor 110 may include a general-purpose processor such as a central processing unit (CPU) or a special-purpose processor such as an application processor, a graphic processing unit (GPU), or an application specific integrated circuit (ASIC). The processor 110 may execute an operating system or firmware for the purpose of controlling the system 100.

The random access memory 120 may be used as a main memory of the processor 110. The random access memory 120 may include a dynamic random access memory (DRAM), a static random access memory (SRAM), a phase-change RAM (PRAM), a magnetic RAM (MRAM), a ferroelectric RAM (FRAM), a resistive RAM (RRAM), etc.

The modem 130 may communicate with an external device in a wired or wireless manner. The modem 130 may transmit data provided from the processor 110 to the external device or may provide data transmitted from the external device to the processor 110. For another example, the modem 130 may transmit data stored in the random access memory 120 to the external device without passing through the processor 110 or may provide data transmitted from the external device to the random access memory 120 without passing through the processor 110.

The hub 140 may connect the processor 110 with peripheral devices of the system 100. For example, the hub 140 may include a root complex that is based on peripheral component interconnect express (PCIe).

The embedded storage device 150 may be a storage device that is fixedly installed in the system 100. In some embodiments, the external storage device 160 may be a storage device that is removably connected with the system 100. The embedded storage device 150 and the external storage device 160 may communicate with the processor 110 through the hub 140.

The embedded storage device 150 may include a hard disk drive, a solid state drive, etc. The external storage device 160 may include a memory card, a memory stick, an optical disk drive, etc.

The user interface 170 may include a user input interface that receives information from a user of the system 100 and a user output interface that provides information to the user of the system 100.

The user interface 170 may include a keyboard, a mouse, a microphone, a touch panel, a touch pad, etc. as the user input interface. The user interface 170 may include a monitor, a printer, a speaker, a beam projector, a vibration motor, etc. as the user output interface.

The system 100 is configured to operate based on the processor 110. Accordingly, the system 100 may be a processor-implemented system. The system 100 may be a general-use computer or a special-purpose computer. Accordingly, operation methods that are performed by the system 100 may be computer-implemented methods.

The system 100 may store instructions that, when executed by the processor 110, cause the processor 110 to perform simulation of a printed circuit board. The instructions may be stored in the system 100 in the form of a specific file or application.

For example, as the instructions, first instructions INS1 may be received through the modem 130. The first instructions INS1 received through the modem 130 may be stored in the embedded storage device 150 non-transitorily as second instructions INS2, may be stored in the external storage device 160 non-transitorily as third instructions INS3, or may be stored in the random access memory 120 non-transitorily as fourth instructions INS4.

For another example, the instructions may be included in the system 100, with the instructions stored non-transitorily in the embedded storage device 150 as the second instructions INS2. Afterwards, the second instructions INS2 may be stored non-transitorily in the random access memory 120 as the fourth instructions INS4.

For another example, the instructions may be stored non-transitorily in the external storage device 160 as the third instructions INS3, and the external storage device 160 may be attached to the system 100. Afterwards, the third instructions INS3 may be stored non-transitorily in the random access memory 120 as the fourth instructions INS4.

For another example, the instructions may be included in the system 100, with the instructions stored in random access memory 120 as the fourth instructions INS4. In this case, the random access memory 120 may include a non-volatile random access memory such as a phase-change random access memory, a ferroelectric random access memory, a magnetic random access memory, or a resistive random access memory.

The embedded storage device 150 storing the second instructions INS2, the external storage device 160 storing the third instructions INS3, or the random access memory 120 storing the fourth instructions INS4 may be a non-transitory computer-readable storage medium that stores instructions for the simulation of the printed circuit board 11.

A way to provide layout data of the printed circuit board 11 may be the same as the way to provide the instructions. For example, layout data may be received through the modem 130 as first layout data LD1, may be provided to the embedded storage device 150 as second layout data LD2, may be stored in the external storage device 160 as third layout data LD3, or may be provided to the random access memory 120 as fourth layout data LD4.

Figure 3:
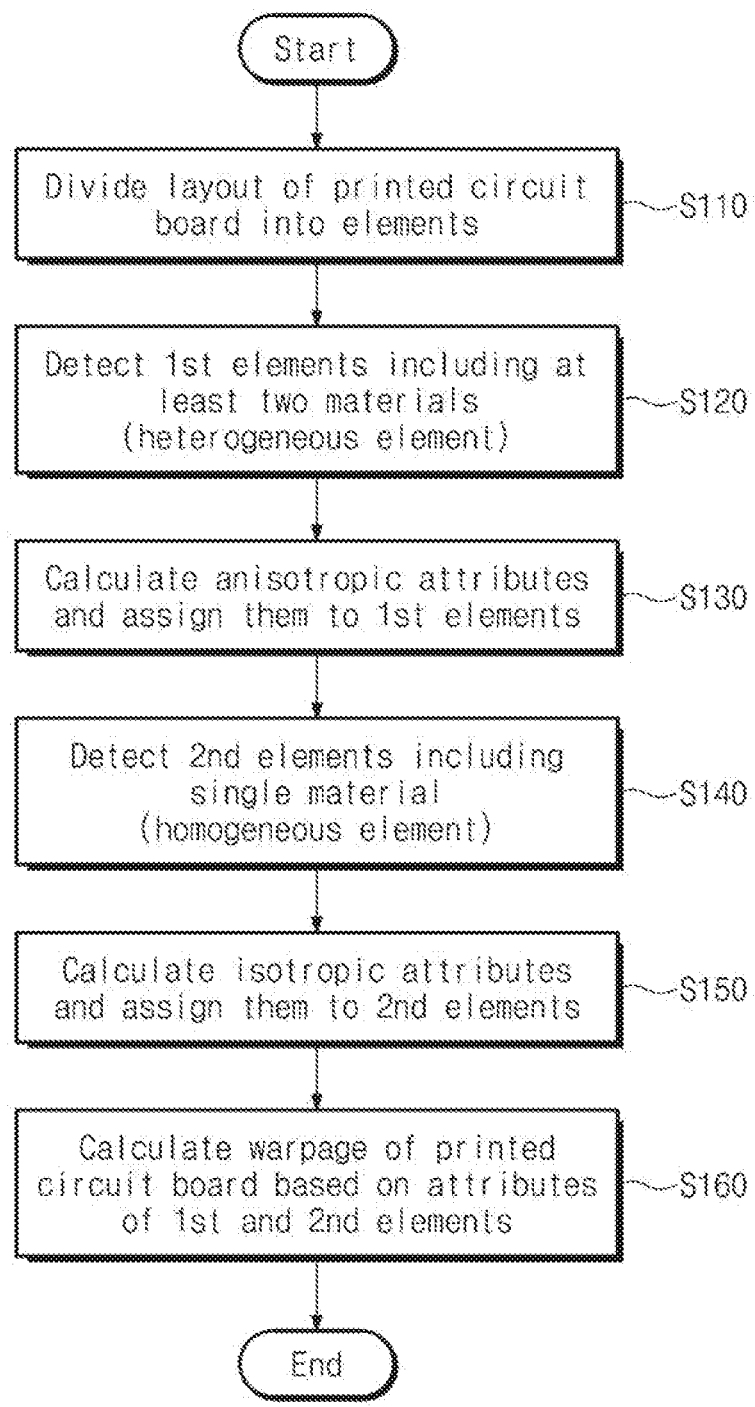
FIG. 3 illustrates an example of a method of performing simulation of a printed circuit board of the system of FIG. 2, according to an embodiment.

FIG. 3 illustrates an example of a method of performing simulation of the printed circuit board 11 of the system 100 of FIG. 2, according to an embodiment. Referring to FIGS. 1 to 3, the processor 110 of the system 100 may start simulation by executing the fourth instructions INS4 stored in the random access memory 120, or by loading a group of instructions of the first to third instructions INS1 to INS3 as the fourth instructions INS4 onto the random access memory 120 and executing the fourth instructions INS4 thus loaded.

Also, the processor 110 of the system 100 may start simulation by reading the fourth layout data LD4 stored in the random access memory 120, or by loading one layout data of the first to third layout data LD1 to LD3 as the fourth layout data LD4 onto the random access memory 120 and executing the fourth layout data LD4 thus loaded. The fourth layout data LD4 may indicate a structure of the printed circuit board 11.

Figure 4:
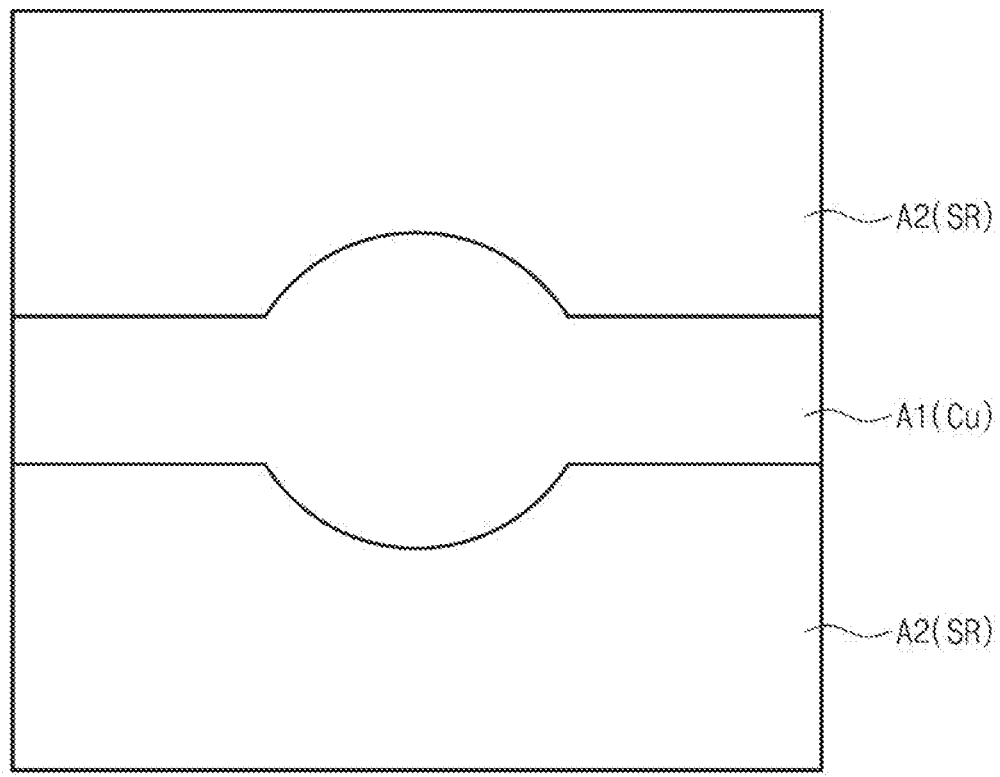
FIG. 4 illustrates an example of a layout of a printed circuit board, according to an embodiment.

FIG. 4 illustrates an example of a layout of the printed circuit board 11. For example, in the printed circuit board 11 of FIG. 1, a partial layout of a surface (e.g., a top surface) that is in contact with the first internal solder balls 13a is illustrated in FIG. 4. A first direction "x", a second direction "y", and a third direction "z" are together illustrated in FIG. 4. The third direction "z" may be a direction facing outwards from the top surface illustrated in FIG. 4 at a right angle.

Referring to FIG. 4, a first area A1 may include a copper Cu, and second areas A2 may include solder registers SR. Top surfaces of the second areas A2 may be higher than a top surface of the first area A1. The solder registers SR of the second areas A2 may prevent materials of solder balls from rolling down when the solder balls are attached to the copper Cu of the first area A1.

Figure 5:
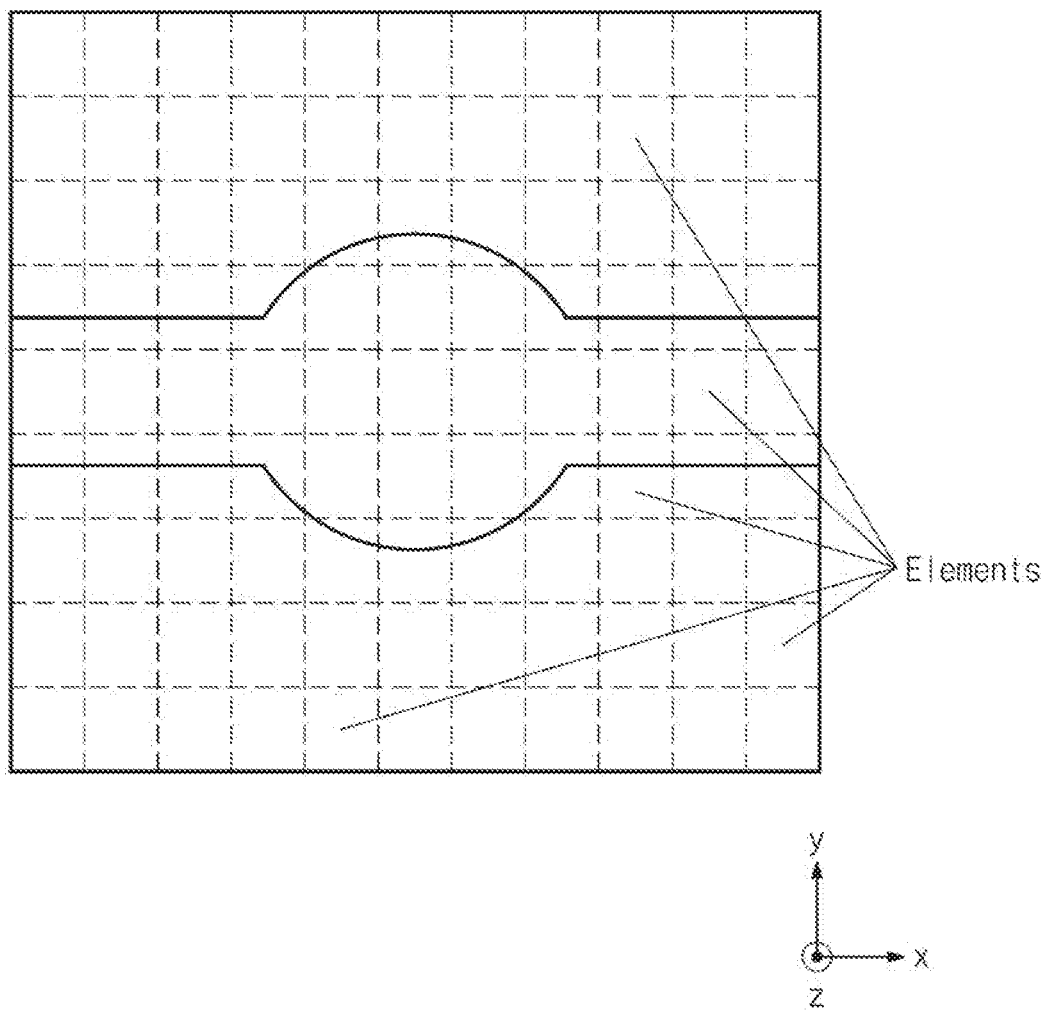
FIG. 5 illustrates an example in which a layout of a printed circuit board is divided into elements, according to an embodiment.

Returning to FIGS. 2 and 3, in operation S110, the processor 110 of the system 100 may divide a layout of the printed circuit board 11 into elements. FIG. 5 illustrates an example in which a layout of the printed circuit board 11 is divided into elements.

Referring to FIG. 5, lines may be drawn along the first direction "x", the second direction "y", and the third direction "z", which are perpendicular to each other. First lines of the first direction "x" may be parallel to each other. Second lines of the second direction "y" may be parallel to each other. Third lines of the third direction "z" may be parallel to each other. The first lines, the second lines, and the third lines may be perpendicular to each other. Areas that are defined by the first lines, the second lines, and the third lines may be selected as elements. In FIG. 5, the first through third lines are shown as dashed lines. However, this is only an example.

Figure 6:
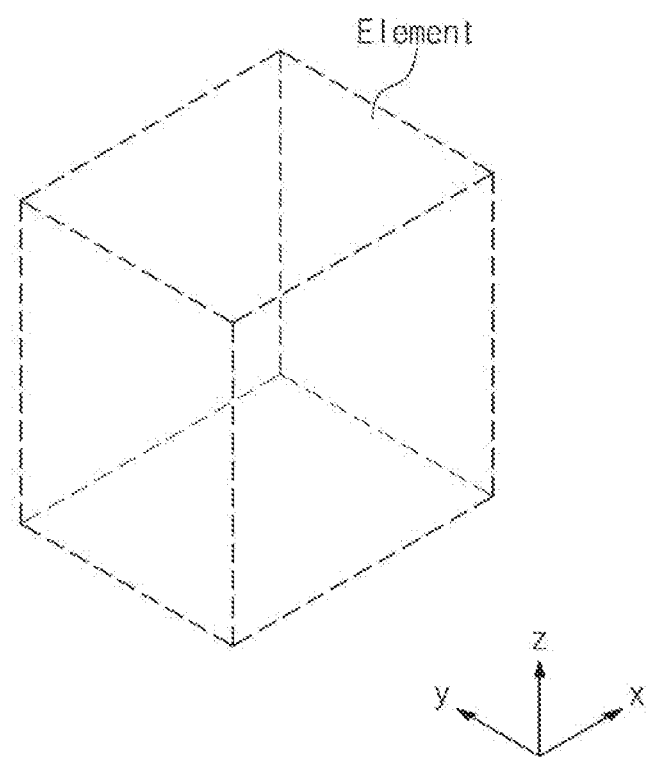
FIG. 6 illustrates an example in which one element is defined by first lines of a first direction, second lines of a second direction, and third lines of a third direction, according to an embodiment.

Because the top surface is viewed two-dimensionally in FIG. 5, the third lines of the third direction "z" are not illustrated. FIG. 6 illustrates an example in which one element is defined by the first lines of the first direction "x", the second lines of the second direction "y", and the third lines of the third direction "z".

Referring to FIGS. 5 and 6, an element that is defined by lines of the first direction "x", the second direction "y", and the third direction "z" may be a hexahedron. In some embodiments, the elements may have the same size (e.g., the area or a volume). The first lines of the first direction "x" may be arranged at regular intervals. The second lines of the second direction "y" may be arranged at regular intervals. The third lines of the third direction "z" may be arranged at regular intervals.

In some embodiments, an interval of the first lines of the first direction "x", an interval of the second lines of the second direction "y", and an interval of the third lines of the third direction "z" may be the same. That is, each element may be a cube.

Returning to FIGS. 2 and 3, in operation S120, the processor 110 of the system 100 may detect first elements including materials of at least two of the elements of the layout of the printed circuit board 11. In operation S130, the processor 110 of the system 100 may calculate anisotropic attributes of the first elements and may assign the calculated anisotropic attributes to the first elements, respectively.

In operation S140, the processor 110 of the system 100 may detect second elements including a material of at least one of the elements of the layout of the printed circuit board 11. In operation S150, the processor 110 of the system 100 may calculate isotropic attributes of the second elements and may assign the calculated isotropic attributes to the second elements, respectively.

Figure 7:
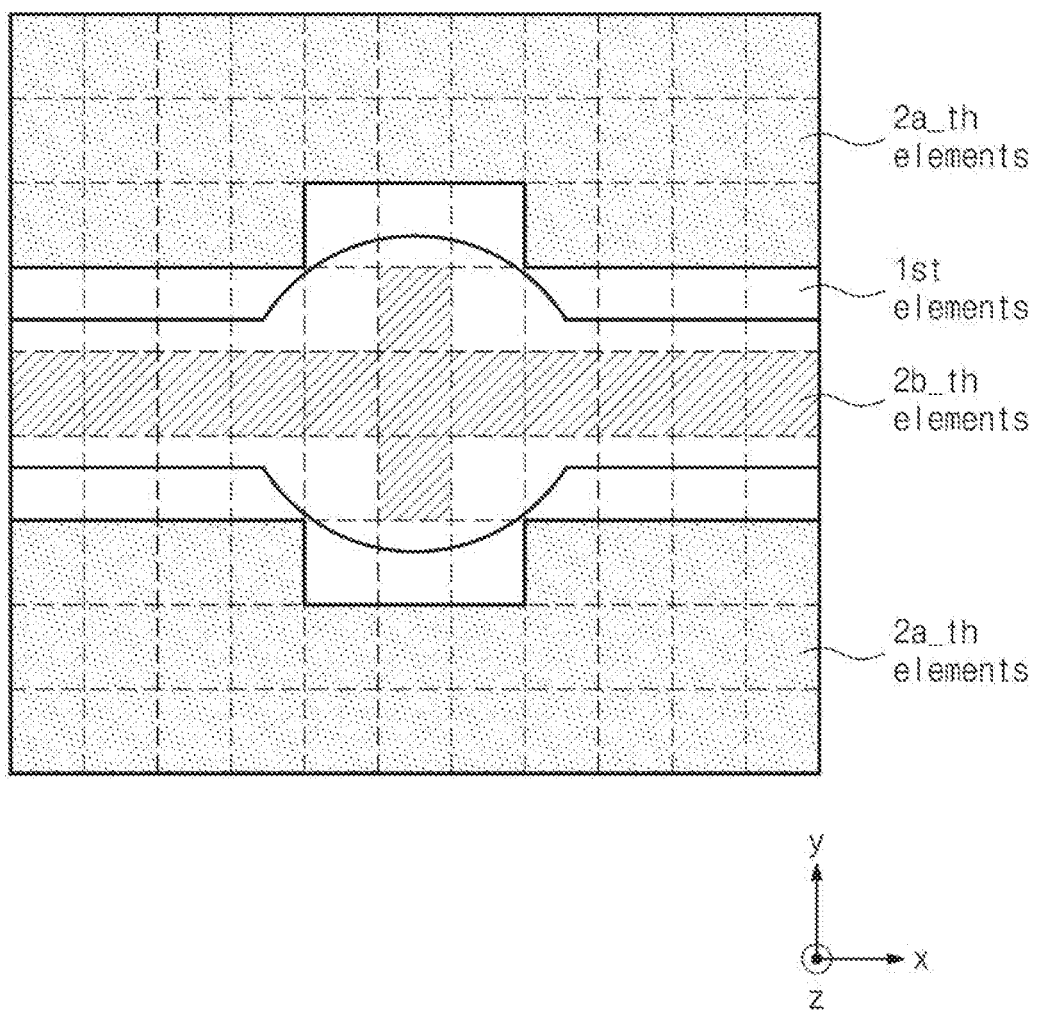
FIG. 7 illustrates an example in which first elements and second elements are detected from elements of a layout of a printed circuit board, according to an embodiment.

FIG. 7 illustrates an example in which first elements and second elements are detected from elements of a layout of the printed circuit board 11. Referring to FIG. 7, a solder register SR and a copper Cu are included in the first elements. As described with reference to FIG. 6, when a top surface of each element and the interior of each element of a hexahedral shape include two or more materials, a corresponding element may be included in the first elements. That is, the first elements may be, for example, heterogeneous elements.

The interior of each of 2a-th elements is filled with dots. For example, the 2a-th elements may include a single material of the solder register SR. As described with reference to FIG. 6, when a top surface of each element and the interior of each element of a hexahedral shape include a single material of the solder register SR, a corresponding element may be included in the 2a-th elements. That is, the second elements may be, for example, homogeneous elements.

The interior of each of 2b-th elements is filled with diagonal lines. For example, the 2b-th elements may include a single material of the copper Cu. As described with reference to FIG. 6, when a top surface of each element and the interior of each element of a hexahedral shape include a single material of the copper Cu, a corresponding element may be included in the 2b-th elements. That is, the second elements may be, for example, homogeneous elements.

Returning to FIGS. 2 and 3, in operation S160, the processor 110 of the system 100 may calculate the warpage of the printed circuit board 11 based on attributes of the first and second elements, that is, the anisotropic attributes and the isotropic attributes.

Afterwards, the processor 110 of the system 100 may provide information of the calculated warpage to the user through the user interface 170. Alternatively, the processor 110 of the system 100 may store the information of the calculated warpage in the random access memory 120, the embedded storage device 150, and/or the external storage device 160 and/or may transmit the information of the calculated warpage to an external device through the modem 130.

For another example, the processor 110 of the system 100 may compare the degree of the calculated warpage with a threshold warpage value. The processor 110 of the system 100 may determine the suitability of the layout of the printed circuit board 11, based on a result of the comparison. For example, when the degree of the warpage is not smaller than or is equal to the threshold warpage value, the processor 110 of the system 100 may determine that the layout of the printed circuit board 11 is warped and thus unsuitable.

When the degree of the warpage is smaller than the threshold value, the processor 110 of the system 100 may determine that the layout of the printed circuit board 11 is not warped and thus is suitable. The processor 110 of the system 100 may provide a determination result of the suitability to the user through the user interface 170. Alternatively, the processor 110 of the system 100 may store the determination result of the suitability in the random access memory 120, the embedded storage device 150, and/or the external storage device 160 and/or may transmit the determination result of the suitability to an external device through the modem 130.

Figure 8:
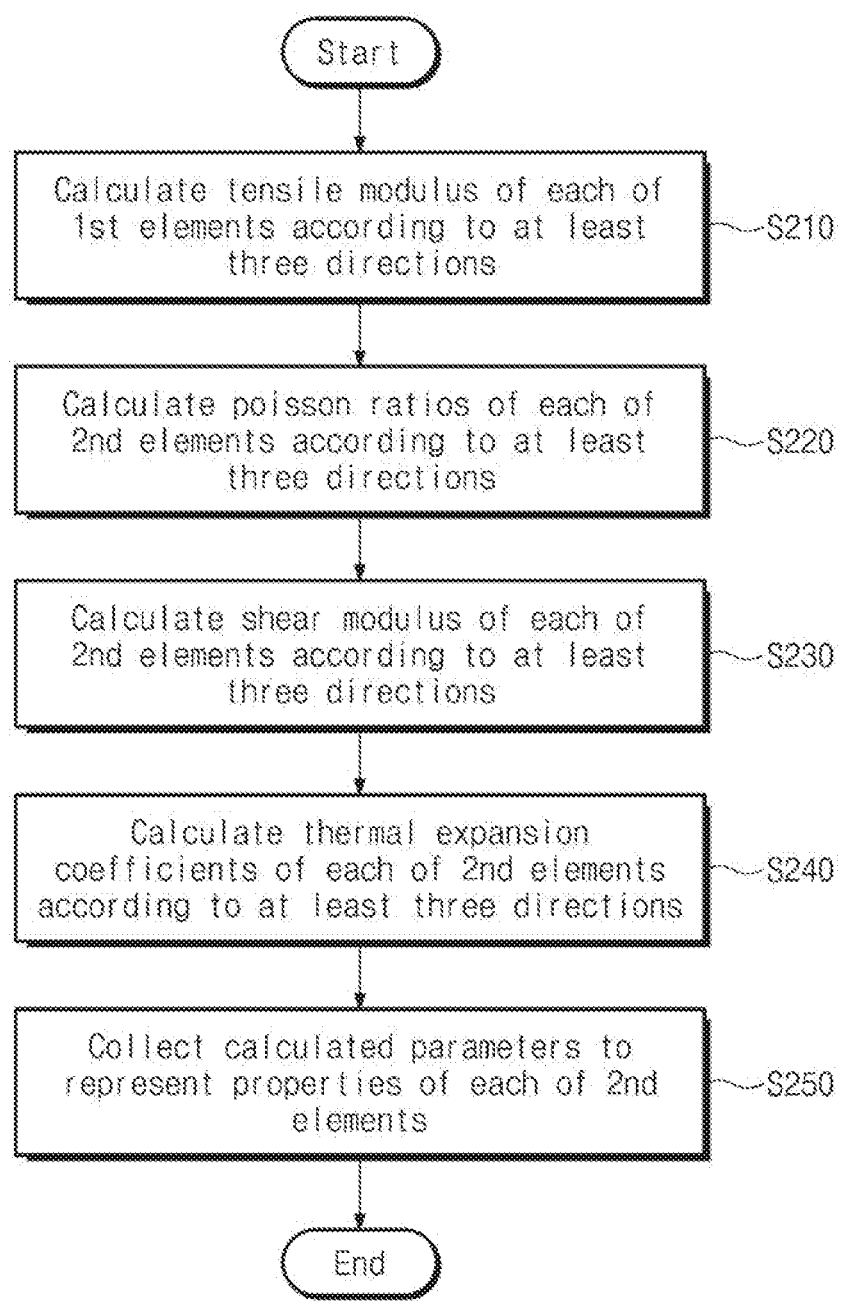
FIG. 8 is a flowchart illustrating an example of calculating anisotropic attributes from first elements, according to an embodiment.

FIG. 8 is a flowchart illustrating an example of calculating anisotropic attributes from first elements, according to an embodiment. Referring to FIGS. 2, 7, and 8, arrangements of internal materials of the first elements are different from each other. Accordingly, the processor 110 of the system 100 may calculate physical properties for two or more directions of each of the first elements.

In operation S210, the processor 110 of the system 100 may calculate tensile moduli according to at least three directions of each of the first elements. The at least three directions may include the first direction "x", the second direction "y", and the third direction "z".

Figure 9:
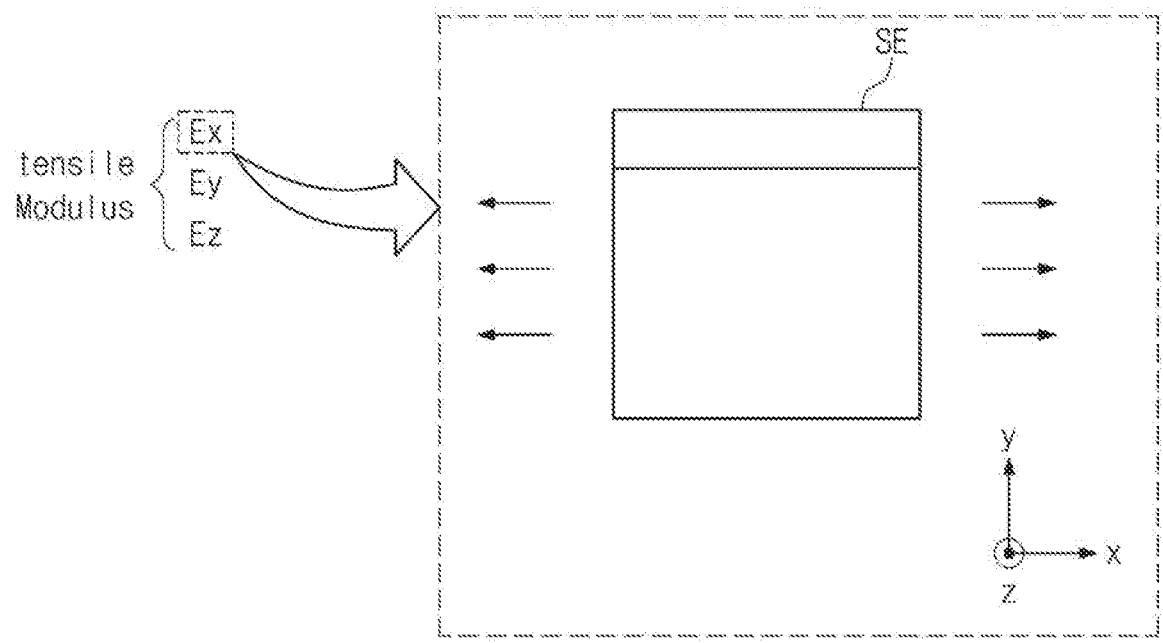
FIG. 9 illustrates an example of calculating first to third tensile moduli according to the first to third directions, according to an embodiment.

FIG. 9 illustrates an example of calculating first, second, and third tensile moduli Ex, Ey, and Ez according to the first, second, and third directions "x", "y", and "z". In an embodiment, an example of calculating the first tensile modulus Ex according to the first direction "x" is illustrated in FIG. 9 Referring to FIG. 9, the first tensile modulus Ex according to the first direction "x" is calculated with regard to a sample element SE of the first elements.

Upon pulling the sample element SE in the first direction "x" or an opposite direction to the first direction "x", the ability that the sample element SE resists without being stretched in the first direction "x" may be calculated as the first tensile modulus Ex. For example, a unit of the first tensile modulus Ex may be pascal (Pa) or a product of a weight and a force per unit area.

Like the first tensile modulus Ex, the second tensile modulus Ey may be calculated for the process of pulling the sample element SE in the second direction "y" or an opposite direction to the second direction "y". Like the first tensile modulus Ex, the third tensile modulus Ez may be calculated for the process of pulling the sample element SE in the third direction "z" or an opposite direction to the third direction "z".

As illustrated in FIG. 7, arrangements of materials included in each of the first elements may be different from each other. Accordingly, calculations of the first, second, and third tensile moduli Ex, Ey, and Ez may be performed on each of the first elements. Because tensile moduli are calculated with respect to different directions of each of the first elements, the accuracy of simulation is improved.

As illustrated in FIG. 7, the 2a-th elements include a single material. Accordingly, as a portion of the process of calculating isotropic attributes of the 2a-th elements as described in operation S150 of FIG. 3, the processor 110 of the system 100 may calculate a tensile modulus of one direction (e.g., one of the first, second, and third directions "x", "y", and "z") with regard to one element of the 2a-th elements.

Because the 2a-elements are homogeneous elements, as a portion of the process of assigning isotropic attributes of the 2a-th elements as described in operation S150 of FIG. 3, the processor 110 of the system 100 may assign the calculated tensile modulus to the first, second, and third tensile moduli Ex, Ey, and Ez of the first, second, and third directions "x", "y", and "z" of each of the 2a-th elements. Accordingly, the amount of operations of the system 100 and the processor 110 decreases, and resources are saved.

Likewise the 2a-th elements, one tensile modulus may be calculated from one of the 2b-th elements, and the one tensile modulus thus calculated may be used as the first, second, and third tensile moduli Ex, Ey, and Ez of each of the 2b-th elements.

Figure 10:
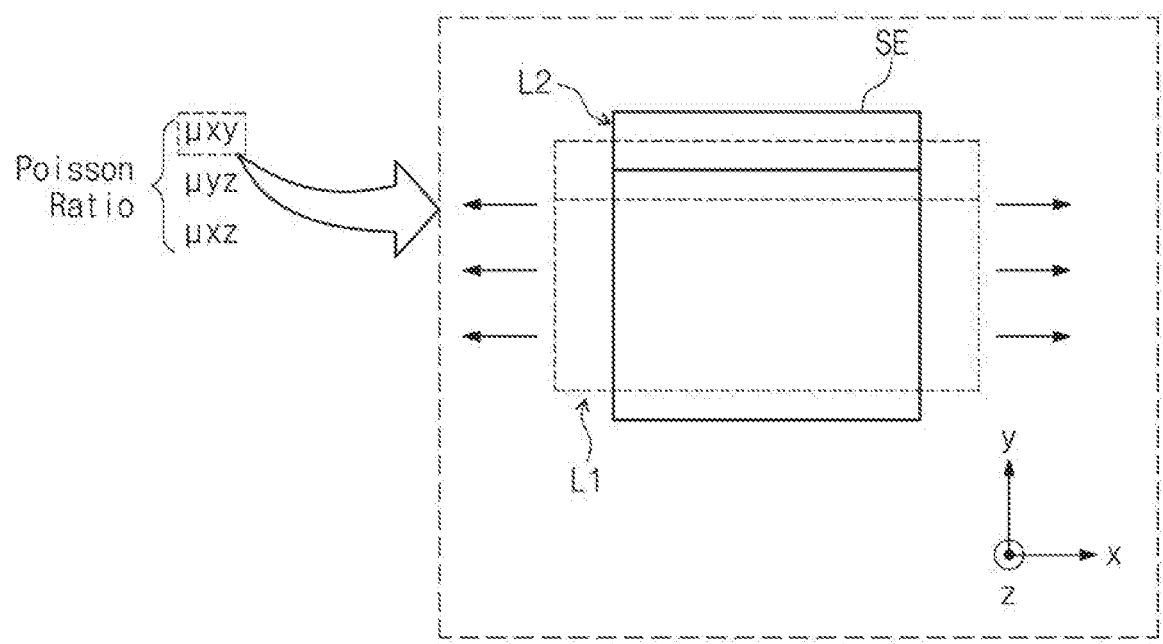
FIG. 10 illustrates an example of calculating first to third Poisson ratios according to the first to third directions, according to an embodiment.

FIG. 10 illustrates an example of calculating first, second, and third Poisson ratios μxy, μyz, and μxz according to the first, second, and third directions "x", "y", and "z". In an embodiment, an example of calculating the first Poisson ratio μxy according to the first direction "x" and the second direction "y" is illustrated in FIG. 10. Referring to FIG. 10, the first Poisson ratio μxy according to the first direction "x" and the second direction "y" is calculated with regard to the sample element SE of the first elements.

Upon pulling the sample element SE in the first direction "x" or an opposite direction to the first direction "x", a ratio of a first length L1, by which the sample element SE is stretched in the first direction "x", and a second length L2, by which the sample element SE is contracted in the second direction "y", may be calculated as the first Poisson ratio μxy. For example, the first Poisson ratio μxy may be a ratio of the second length L2 to the first length L1 or a ratio of the first length L1 to the second length L2.

Like the first Poisson ratio μxy, the second Poisson ratio μyz may be calculated for the process of pulling the sample element SE in the second direction "y" or an opposite direction to the second direction "y". A ratio of a length, by which the sample element SE is stretched in the second direction "y", and a length, by which the sample element SE is contracted in the third direction "z", may be calculated as the second Poisson ratio μyz.

Like the first Poisson ratio μxy, the third Poisson ratio μxz may be calculated for the process of pulling the sample element SE in the first direction "x" or an opposite direction to the first direction "x". A ratio of a length, by which the sample element SE is stretched in the first direction "x", and a length, by which the sample element SE is contracted in the third direction "z", may be calculated as the third Poisson ratio μxz.

As illustrated in FIG. 7, arrangements of materials respectively included in the first elements may be different from each other. Accordingly, calculations of the first, second, and third Poisson ratios μxy, μyz, and μxz may be performed on each of the first elements. Because the first, second, and third Poisson ratios μxy, μyz, and μxz are calculated with respect to different directions of each of the first elements, the accuracy of simulation is improved.

As illustrated in FIG. 7, the 2a-th elements include a single material. Accordingly, as a portion of the process of calculating isotropic attributes of the 2a-th elements as described in operation S150 of FIG. 3, the processor 110 of the system 100 may calculate a Poisson ratio (e.g., μxy, μyz, or μxz) of two directions with regard to one element of the 2a-th elements.

Because the 2a-th elements are homogeneous elements, as a portion of the process of assigning isotropic attributes of the 2a-th elements as described in operation S150 of FIG. 3, the processor 110 of the system 100 may assign the calculated Poisson ratio to the first, second, and third Poisson ratios μxy, μyz, and μxz of each of the 2a-th elements. Accordingly, the amount of operations of the system 100 and the processor 110 decreases, and resources are saved.

Likewise the 2a-th elements, one Poisson ratio may be calculated from one of the 2b-th elements, and the one Poisson ratio thus calculated may be used as the first, second, and third Poisson ratios μxy, μyz, and μxz of each of the 2b-th elements.

Figure 11:
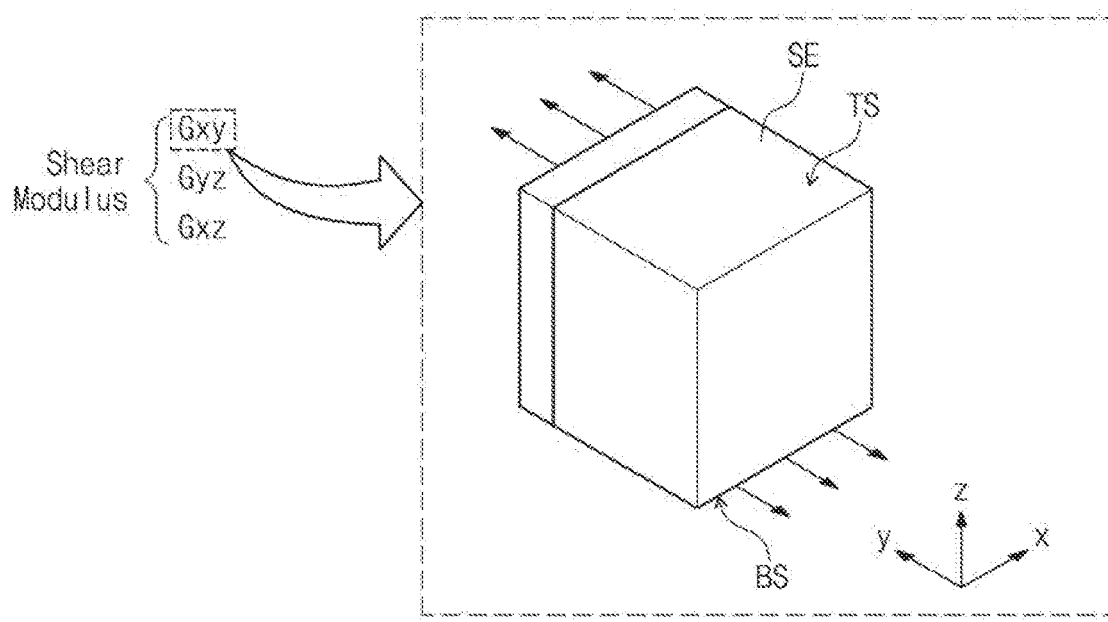
FIG. 11 illustrates an example of calculating first to third shear moduli according to the first to third directions, according to an embodiment.

FIG. 11 illustrates an example of calculating first, second, and third shear moduli Gxy, Gyz, and Gxz according to the first, second, and third directions "x", "y", and "z". In an embodiment, an example of calculating the first shear modulus Gxy according to the first direction "x" and the second direction "y" is illustrated in FIG. 11. Referring to FIG. 11, the first shear modulus Gxy according to the first direction "x" and the second direction "y" is calculated with regard to the sample element SE of the first elements.

A top surface TS and a bottom surface BS of the sample element SE may be selected with respect to a plane defined by the first direction "x" and the second direction "y". In the top surface TS of the sample element SE, a force may be applied in the first direction "x", the second direction "y", or in a direction between the first direction "x" and the second direction "y". In the bottom surface BS of the sample element SE, the same force may be applied in an opposite direction of the force applied to the top surface TS. In this case, the ability that the sample element resists without deformation may be calculated as the first shear modulus Gxy. For example, a unit of the first shear modulus Gxy may be pascal (Pa) or a product of a weight and a force per unit area.

Like the first shear modulus Gxy, the second shear modulus Gyz of the second direction "y" and the third direction "z" may be calculated. A top surface and a bottom surface of the sample element SE may be selected with respect to a plane defined by the second direction "y" and the third direction "z". The ability that the sample element resists without deformation upon applying forces of opposite directions to the top surface and the bottom surface may be calculated as the second shear modulus Gyz.

Like the first shear modulus Gxy, the third shear modulus Gxz of the first direction "x" and the third direction "z" may be calculated. A top surface and a bottom surface of the sample element SE may be selected with respect to a plane defined by the first direction "x" and the third direction "z". The ability that the sample element resists without deformation upon applying forces of opposite directions to the top surface and the bottom surface may be calculated as the third shear modulus Gxz.

As illustrated in FIG. 7, arrangements of materials respectively included in the first elements may be different from each other. Accordingly, calculations of the first, second, and third shear moduli Gxy, Gyz, and Gxz may be performed on each of the first elements. Because shear moduli are calculated with respect to different directions of each of the first elements, the accuracy of simulation is improved.

As illustrated in FIG. 7, the 2a-th elements include a single material. Accordingly, as a portion of the process of calculating isotropic attributes of the 2a-th elements as described in operation S150 of FIG. 3, the processor 110 of the system 100 may calculate a shear modulus (e.g., Gxy, Gyz, or Gxz) of two directions with regard to one element of the 2a-th elements.

Because the 2a-th elements are homogeneous elements, as a portion of the process of assigning isotropic attributes of the 2a-th elements as described in operation S150 of FIG. 3, the processor 110 of the system 100 may assign the calculated shear modulus to the first, second, and third shear moduli Gxy, Gyz, and Gxz of each of the 2a-th elements. Accordingly, the amount of operations of the system 100 and the processor 110 decreases, and resources are saved.

Figure 12:
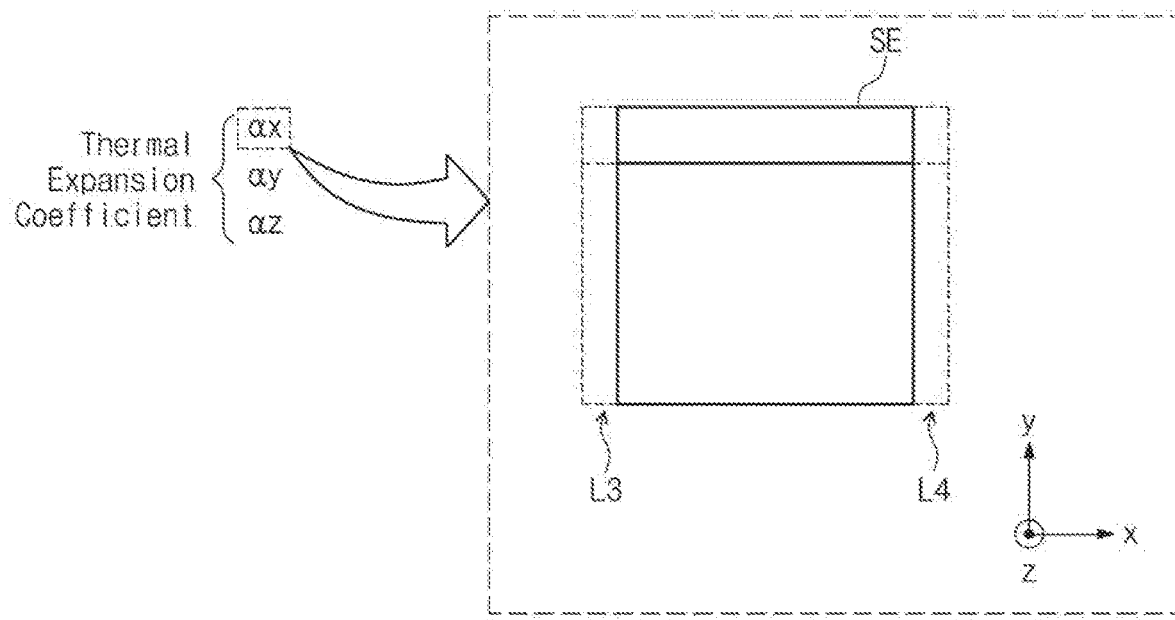
FIG. 12 illustrates an example of calculating first to third thermal expansion coefficients according to the first to third directions, according to an embodiment.

Likewise the 2a-th elements, one shear modulus may be calculated from one of the 2b-th elements, and the one shear modulus thus calculated may be used as the first, second, and third shear moduli Gxy, Gyz, and Gxz of each of the 2b-th elements. [98] FIG. 12 illustrates an example of calculating first, second, and third thermal expansion coefficients αx, αy, and αz according to the first, second, and third directions "x", "y", and "z". In an embodiment, an example of calculating the first thermal expansion coefficient αx according to the first direction "x" is illustrated in FIG. 12. Referring to FIG. 12, the first thermal expansion coefficient αx according to the first direction "x" is calculated with regard to a sample element SE of the first elements.

When a temperature of the sample element SE increases from an initial temperature by 1 degree, a ratio of a third length L3 and a fourth length L4, by which the sample element SE expands in the first direction "x", and an original length of the sample element in the first direction "x" may be calculated as the first thermal expansion coefficient αx. For example, the first thermal expansion coefficient αx may be a ratio of the third length L3 and the fourth length L4 to the original length of the sample element SE in the first direction "x" or a ratio of the original length of the sample element SE in the first direction "x" to the third length L3 and the fourth length L4.

Likewise the first thermal expansion coefficient αx, the degree to which the sample element SE expands in the second direction "y" when a temperature of the sample element SE increases 1 degree may be calculated as the second thermal expansion coefficient αy. Also, the degree to which the sample element SE expands in the third direction "z" when a temperature of the sample element SE increases 1 degree may be calculated as the third thermal expansion coefficient αz.

As illustrated in FIG. 7, arrangements of materials respectively included in the first elements may be different from each other. Accordingly, calculations of the first, second, and third thermal expansion coefficients αx, αy, and αz may be performed on each of the first elements. Because the first, second, and third thermal expansion coefficients αx, αy, and αz are calculated with respect to different directions of each of the first elements, the accuracy of simulation is improved.

As illustrated in FIG. 7, the 2a-th elements include a single material. Accordingly, as a portion of the process of calculating isotropic attributes of the 2a-th elements as described in operation S150 of FIG. 3, the processor 110 of the system 100 may calculate a thermal expansion coefficient (e.g., αx, αy, or αz) of one direction with regard to one element of the 2a-th elements.

Because the 2a-th elements are homogeneous elements, as a portion of the process of assigning isotropic attributes of the 2a-th elements as described in operation S150 of FIG. 3, the processor 110 of the system 100 may assign the calculated thermal expansion coefficient to the first, second, and third thermal expansion coefficients αx, αy, and αz of each of the 2a-th elements. Accordingly, the amount of operations of the system 100 and the processor 110 decreases, and resources are saved.

Likewise the 2a-th elements, one thermal expansion coefficient may be calculated from one of the 2b-th elements, and the one thermal expansion coefficient thus calculated may be used as the first, second, and third thermal expansion coefficients αx, αy, and αz of each of the 2b-th elements.

Figure 13:
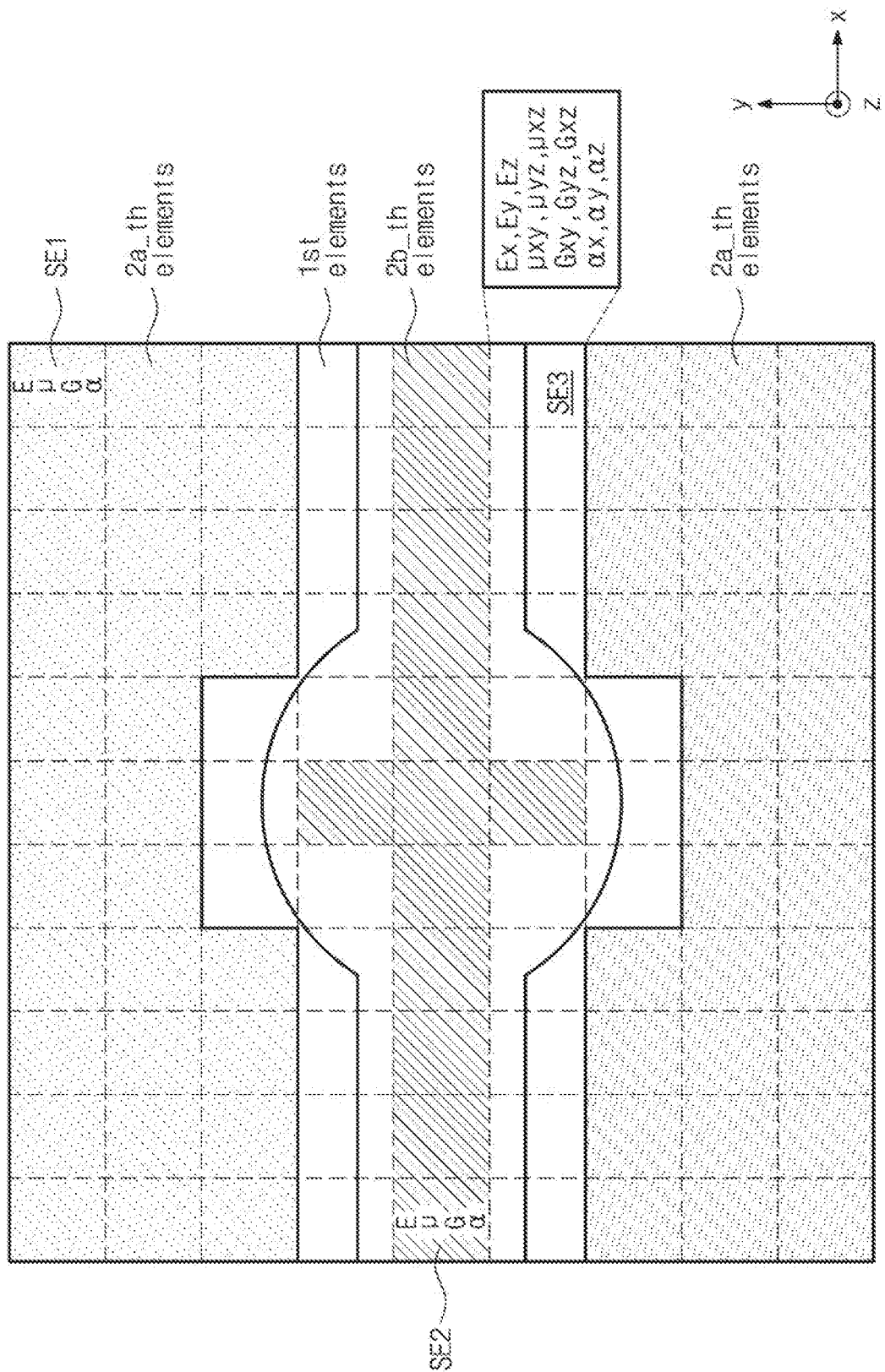
FIG. 13 illustrates an example in which physical properties are calculated with regard to elements of a layout of a printed circuit board, according to an embodiment.

FIG. 13 illustrates an example in which physical properties are calculated with regard to elements of a layout of the printed circuit board 11. Referring to FIG. 13, anisotropic attributes may be calculated with respect to each of the first elements. Physical properties that are calculated as anisotropic attributes include the first, second, and third tensile moduli Ex, Ey, and Ez, the first, second, and third Poisson ratios μxy, μyz, and μxz, the first, second, and third shear moduli Gxy, Gyz, and Gxz, and the first, second, and third thermal expansion coefficients αx, αy, and αz.

Isotropic attributes may be calculated with respect to each of the 2a-th elements and the 2b-th elements. Physical properties that are calculated as isotropic attributes includes one tensile modulus "E", one Poisson ratio "μ", one shear modulus "G", and one thermal expansion coefficient "α".

According to embodiments of the inventive concept, in the case of homogeneous elements, as the amount of operations for a homogeneous element including one material is reduced, the amount of operations for simulation of the printed circuit board 11, computing resources used to perform the operations, and a time used to perform the operations decreases. Also, according to embodiments of the inventive concept, in the case of heterogeneous elements, as an operation is focused on a heterogeneous element including two or more materials, the accuracy of simulation of the printed circuit board 11 is improved.

In particular, according to embodiments of the inventive concept, as the size of an element decreases, the accuracy of simulation is improved. Also, as the size of an element decreases, a ratio of isotropic elements to the total number of elements increases, and a ratio of anisotropic elements to the total number of elements decreases. Accordingly, compared to the degree to which the accuracy increases, the degree to which the amount of operations, a computing resources used, or a simulation time increases is not great.

As described above, components of the system 100 and a method performed in the system 100 are described by using the terms "first", "second", "third", and the like. However, the terms "first", "second", "third", and the like may be used to distinguish components from each other and do not limit the inventive concept. For example, the terms "first", "second", "third", and the like do not involve an order or a numerical meaning of any form.

In the above embodiments, components according to embodiments of the inventive concept are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits or intellectual property (IP) implemented with semiconductor elements in an integrated circuit.

According to the inventive concept, simulation of a printed circuit board is performed by calculating anisotropic attributes with regard to elements including two or more materials and is performed by calculating isotropic attributes with regard to elements including a single material. Accordingly, a computer-implemented method and a processor-implemented system, which perform simulation of a printed circuit board with improved accuracy or by using reduced resources, and a non-transitory computer-readable storage medium storing instructions for simulation of the printed circuit board are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A computer-implemented method for a simulation of a printed circuit board, the method comprising:
   dividing a layout of the printed circuit board into elements having the same size;
   detecting first elements that have at least two materials from the elements;
   calculating anisotropic attributes of the first elements and assigning the anisotropic attributes to each of the first elements; and
   calculating a warpage of the printed circuit board based on the anisotropic attributes of the first elements,
   wherein the anisotropic attributes depend on physical properties according to directions of the first elements on the layout.

2. The method of claim 1, further comprising:
   detecting second elements that have a single material from the elements; and
   calculating isotropic attributes of the second elements and assigning the isotropic attributes to each of the second elements,
   wherein the calculating of the warpage of the printed circuit board includes:
   calculating the warpage based on the anisotropic attributes of the first elements and the isotropic attributes of the second elements.

3. The method of claim 2, wherein the calculating of the isotropic attributes includes:
   calculating a physical property of one element of the second elements with regard to only one direction on the layout; and
   applying the physical property associated with the one direction to two or more directions of each of the second elements.

4. The method of claim 1, wherein the dividing of the layout of the printed circuit board into the elements having the same size includes:
   applying first lines of a first direction, second lines of a second direction, and third lines of a third direction to the layout, the first direction, the second direction, and the third direction being perpendicular to each other; and
   selecting hexahedrons of the layout defined by the first lines, the second lines, and the third lines as the elements.

5. The method of claim 4, wherein the calculating of the anisotropic attributes includes:
   calculating first tensile moduli of the first elements in the first direction;
   calculating second tensile moduli of the first elements in the second direction; and
   calculating third tensile moduli of the first elements in the third direction.

6. The method of claim 4, wherein the calculating of the anisotropic attributes includes:
   calculating first Poisson ratios of the second direction respectively upon pulling the first elements in the first direction;
   calculating second Poisson ratios of the third direction respectively upon pulling the first elements in the second direction; and
   calculating third Poisson ratios of the third direction respectively upon pulling the first elements in the first direction.

7. The method of claim 4, wherein the calculating of the anisotropic attributes includes:
   calculating first shear moduli of the first elements respectively with regard to a plane defined by the first direction and the second direction;
   calculating second shear moduli of the first elements respectively with regard to a plane defined by the second direction and the third direction; and
   calculating third shear moduli of the first elements respectively with regard to a plane defined by the first direction and the third direction.

8. The method of claim 4, wherein the calculating of the anisotropic attributes includes:
   calculating first thermal expansion coefficients of the first elements respectively with regard to the first direction;
   calculating second thermal expansion coefficients of the first elements respectively with regard to the second direction; and
   calculating third thermal expansion coefficients of the first elements respectively with regard to the third direction.

9. The method of claim 1, further comprising:
   determining that the printed circuit board is suitable based on the warpage being less than a threshold warpage value.

10. The method of claim 1, wherein the printed circuit board is configured to stack a semiconductor die within a semiconductor package and includes wires electrically connected with the semiconductor die.

11. A processor-implemented system for a simulation of a printed circuit board, comprising:
    a processor; and
    a non-transitory computer-readable recording medium configured to communicate with the processor and to store instructions that, when executed by the processor, cause the processor to perform operations including:
    dividing a layout of the printed circuit board into elements having the same size;
    detecting first elements that have at least two materials from the elements;
    calculating anisotropic attributes of the first elements and assigning the anisotropic attributes to each of the first elements; and
    calculating a warpage of the printed circuit board based on the anisotropic attributes of the first elements, and wherein the anisotropic attributes depend on directions of the first elements on the layout.

12. The processor-implemented system of claim 11, wherein the operations further include:
   detecting second elements that have a single material from the elements; and
   calculating isotropic attributes of the second elements and assigning the isotropic attributes to each of the second elements, and
   wherein the calculating of the warpage of the printed circuit board includes:
   calculating the warpage based on the anisotropic attributes of the first elements and the isotropic attributes of the second elements.

13. The processor-implemented system of claim 12, wherein the dividing of the layout of the printed circuit board into the elements having the same size includes:
   applying first lines of a first direction, second lines of a second direction, and third lines of a third direction to the layout, the first direction, the second direction, and the third direction being perpendicular to each other; and
   selecting hexahedrons of the layout defined by the first lines, the second lines, and the third lines as the elements.

14. The processor-implemented system of claim 13, wherein the calculating of the isotropic attributes of the second elements includes:
   calculating a physical property of one element of the second elements with regard to at least one of the first direction, the second direction, and the third direction.

15. The processor-implemented system of claim 14, wherein the assigning of the isotropic attributes to the second elements includes:
   assigning the physical property to physical properties of each of the second elements with regard to the first direction, the second direction, and the third direction.

16. The processor-implemented system of claim 14, wherein the physical property includes at least one of a tensile modulus, a Poisson ratio, a shear modulus, and a thermal expansion coefficient associated with the at least one of the first direction, the second direction, and the third direction.

17. The processor-implemented system of claim 13, wherein the calculating of the isotropic attributes includes:
   calculating physical properties of each of the first elements with regard to the first direction, the second direction, and the third direction.

18. The processor-implemented system of claim 11, wherein the operations further include:
   determining that the printed circuit board is suitable based on the warpage being less than a threshold warpage value.

19. A non-transitory computer-readable recording medium that stores instructions that, when executed by a processor, the cause the processor to perform operations including:
   dividing a layout of the printed circuit board into elements having the same size;
   detecting first elements that have at least two materials from the elements;
   calculating anisotropic attributes of the first elements and assigning the anisotropic attributes to each of the first elements;
   detecting second elements that have a single material from the elements;
   calculating isotropic attributes of the second elements and assigning the isotropic attributes to each of the second elements; and
   calculating a warpage of the printed circuit board based on the anisotropic attributes of the first elements and the isotropic attributes of the second elements.

20. The non-transitory computer-readable recording medium of claim 19, wherein the calculating of the anisotropic attributes of the first elements includes:
   calculating first physical properties according to at least two directions with regard to each of the first elements, and
   wherein the calculating of the isotropic attributes of the second elements includes:
   calculating second physical properties according to only one direction with regard to one of the second elements.

* * * * *